United States Patent [19]

Porter et al.

[11] 4,172,967

[45] Oct. 30, 1979

[54] AUTOMATIC ANSWERING DEVICE FOR USE IN LIVE SPEECH COMMUNICATION AND CIRCUIT COMPONENTS THEREOF

[75] Inventors: James J. Porter, 288 Massachusetts Ave., Arlington, Mass. 02174; Robert G. Bresler, Brighton, Mass.

[73] Assignee: James John Porter, Arlington, Mass.

[21] Appl. No.: 915,454

[22] Filed: Jun. 14, 1978

Related U.S. Application Data

[63] Continuation of Ser. No. 772,017, Feb. 25, 1977, abandoned, which is a continuation of Ser. No. 620,596, Oct. 8, 1975, abandoned.

[51] Int. Cl.² ............................................. H04M 1/60
[52] U.S. Cl. ................................. 179/1 HF; 179/2 A
[58] Field of Search ............... 179/1 H, 1 HF, 1 VC, 179/1 VL, 2 R, 2 A, 18 AD, 37, 38, 39, 81 R

[56] References Cited

U.S. PATENT DOCUMENTS

| 2,826,636 | 3/1958 | Beatty | 179/1 HF |
| 3,030,446 | 4/1962 | Briggs | 179/1 HF |

Primary Examiner—Kathleen H. Claffy
Assistant Examiner—Joseph A. Popek

[57] ABSTRACT

This device enables apartment dwellers to communicate with and thereby identify persons desiring ingress to an apartment building through a controlled access vestibule. The convenience and security of a conventional intercom is provided by this device, but without substations and their associated dedicated wiring. Communication is initiated via residential telephones which effect a ringing signal (to be sent) from the central telephone office to the device. This device automatically answers the incoming call on the line, transmits an audible signal in the preferred embodiment, enables voice communication, and disconnects.

20 Claims, 5 Drawing Figures

AUTOMATIC ANSWERING DEVICE FOR USE IN LIVE SPEECH COMMUNICATION AND CIRCUIT COMPONENTS THEREOF This is a continuation of application Ser. No. 772,017, filed Feb. 25, 1977, now abandoned, as a continuation of Ser. No. 620,596, filed Oct. 8, 1975, now abandoned.

BACKGROUND REFERENCES

U.S. Pat. No. 2,064,186
U.S. Pat. No. 2,425,187
U.S. Pat. No. 3,304,376
U.S. Pat. No. 3,491,353

BACKGROUND OF THE INVENTION

Since the early 1900's lobby intercom systems incorporating a door buzzer and vestibule door with electrically operated lock release have enabled apartment residents to screen visitors. In recent years, these systems have been instrumental in reducing the incidence of crime in interior spaces, i.e., in apartments and common user areas of buildings which have them installed.

Notwithstanding the effectiveness of lobby intercoms in controlling access, there is a large percentage of buildings which do not have them owing to the cost of expensive substations and dedicated wiring for each apartment, and to the cost of labor associated with such installations. A similarly large percentage of apartment buildings, however, has door buzzers and vestibule doors with electrically operated lock releases. Since there is also a large percentage of apartment dwellings which have telephone service or at least wiring installed for service, it is the general purpose of the invention to provide an intercom device capable of combined use with these existing instruments so as to effect a practical and inexpensive system of access control as conventional substations and associated dedicated wiring would not be required for communication if standard telephones and commercial lines provided the communication link between apartments and the vestibule. By dialing a number known only to the residents of the building, apartment dwellers could initiate a call to the intercom device in response to a door buzzer signal.

The standard telephone set might at first appear to be a suitable device to permit communication from the vestibule; however, there are certain problems that could make its use in this system undesirable. If a standard telephone set (with conventional cradle switch, handset, dial, and ringer) were employed, an off-hook/busy condition could result due to accidental or vandal related uncradling of the handset, thus rendering the system inoperative and indicating to the telephone company central exchange that there is trouble on the line. In addition such a system could be misused by talkative users whose lengthy calls might prevent others from using it for its intended purpose.

There would also be the possibility of damage to a standard telephone set by vandals. Even if an armored cable were used to connect the handset to the base unit, there would still exist the possibility that the handset might be disassembled, broken, or severed completely. Also vulnerable to vandalism would be a standard telephone base set and dial assembly.

If a standard telephone set were used in the vestibule to initiate a call to an apartment telephone set, two additional problems would be posed for apartment dwellers. First, if the apartment telephone were in use when the visitor dialed the apartment dweller, neither signalling or identification would be effected. Second, the disclosure of the telephone numbers of the apartment dwellers would be deemed necessary to initiate telephone calls thereto, which may be regarded as a breach of security and privacy.

For the aforementioned reasons, a standard telephone set with conventional cradle switch, handset, dial, and ringer would not be practical.

THE PRESENT INVENTION

While the invention is herein discussed primarily in connection with a device for use in effecting communication between a common area and any one of a number of individual areas, where means exist enabling a person in the common area to signal a person in an individual area and means enabling the signalled person to unlock the normally locked door common to the individual area, it is not limited thereto as devices in accordance therewith may be used wherever hand-free communication is wanted in an automatic talk-listen system.

The general objective of the invention is accordingly attained with a device incapable of initiating a call, but which embodies circuitry capable of detecting the incoming ringing signal and circuitry capable of providing a connection for live speech communication which is under the control of means by which the origin of speech signals originating at either the microphone or incoming from the telephone line is discerned and is operable to enable, alternatively, either microphone live speech signals to reach the telephone line or telephone line live speech signals to reach the speaker depending on whichever live speech signal is introduced into the device first; and which provides circuitry capable of automatic hang-up/disconnect of the telephone call which enables automatic answering of the next incoming telephone call.

Necessary to the operation of the automatic control circuitry embodied in this device is the provision of a signal to initiate same. This signal is the ringing signal provided by the telephone company central exchange as the result of a call initiated by the apartment dweller. The initiation of this telephone call is in response to a conventional door buzzer which signals to the apartment dweller that a visitor desires to gain ingress through a controlled access vestibule.

Detection of the incoming ringing signal can be accomplished by certain circuitry that responds to the frequency or amplitude or both of the ringing voltage provided by the telephone company central exchange. In the preferred embodiment an authorized protective connecting module (APCM) is employed of which circuitry capable of performing this function is an integral part.

An off-hook condition is effected (automatic answering) by a switching device, either solid state or electromechanical, operated in response to an internally generated control voltage signal which is provided by a timer in the preferred embodiment, so as to connect across the telephone line an impedance of sufficiently low magnitude to effect same. In the preferred embodiment, this function is provided by an electro-mechanical relay in the APCM, but can certainly be provided by other known means. The employment of automatic answering circuitry thus eliminates the possibility of an off-hook condition due to uncradling from any cause (because of the elimination of this cradle switch function).

In the preferred embodiment, an audible tone signal is generated at the initiation of the automatic answering function so as to indicate to both parties on the telephone line that a connection has been established. Unlike the function of a ringer or bell in a standard telephone set which signals the necessity of a manual answering operation, the function of the tone signal of the device is to indicate to both parties on the telephone line that a connection has been established.

Speech processing circuitry is provided that couples live speech signals into and out of the telephone line. While in the "talking mode" (as later explained in detail) live speech signals received by the microphone are amplified and fed into the telephone line, while signals originating on the telephone line (which would otherwise be amplified and fed to a speaker) are attenuated. While in the "listening mode" (as later explained in detail), microphone signals are attenuated before reaching the telephone line, while signals originating on the telephone line are amplified and fed to a speaker. The microphone and speaker as embodied in this device provides hands-free operation thereby eliminating the possibility of damage to a handset, which incorporates a mouth piece and ear piece which the microphone and speaker necessarily replace.

The hang-up/disconnect function can be provided by circuitry capable of the detection of the cessation of speech, or by circuitry capable of the detection of calling party control (CIC) signals provided by the telephone company central exchange, or by other means, as in the case of the preferred embodiment, in which a timer circuit is employed to provide both the automatic off-hook/answering and automatic hang-up/disconnect control voltage signals. The automatic hang-up/disconnect function in the preferred embodiment assures the maximum effective use of the system by appropriately limiting the time alloted for each call, and enables the automatic answering of the next incoming call.

By providing a device incapable of initiating a call, but which embodies circuitry capable of effecting on and off hook conditions automatically, and of processing live speech signals, on a hands-free basis, the invention is capable of providing a practical and inexpensive means of communicating with, and thereby identifying, visitors desiring ingress through a controlled access vestibule.

By way of summary of the objectives of the invention as set forth above, a device in accordance therewith is connectable to the telephone central exchange via a telephone line and employs telephone line control circuitry capable of detecting a ringing signal, of effecting line seizure and of effecting line release and of providing a signal path for live speech communication. The device includes speech processing circuitry incorporating a microphone, a speaker and their respective circuits and speech control circuitry providing means for discerning the origin of speech signals originating at either the microphone or incoming from the telephone line and operable to enable alternatively either live microphone speech signals to reach the line or live telephone line speech signals to reach the speaker depending on whichever live speech signal is introduced into the device first. The device also has a telephone line control circuit connectable to and controlling the telephone line and connected to and controlling the speech processing circuitry and provided with means operable on a ringing signal to provide the control voltage to effect and maintain line seizure and to release the telephone line upon reduction in amplitude of said voltage.

Although the primary purpose of the combination of the circuitry in this device is as discussed previously, the individual circuits embodied in this device provide functions unique by themselves or in other combinations that may be utilized for other purposes.

As previously stated, circuits embodied in the device are adaptable for uses other than that of providing for communication between a person seeking entrance and a person in control of such entrance; such other purpose being hands-free speaker phones, independently used communication devices, or any of a variety of communication equipment affording its users hands-free communication by effecting automatic talk-listen modes of operation.

BRIEF DESCRIPTION OF THE DRAWINGS

In the accompanying drawings, a preferred embodiment of the invention is illustrated

THE PREFERRED EMBODIMENT OF THE INVENTION

Figure 1:
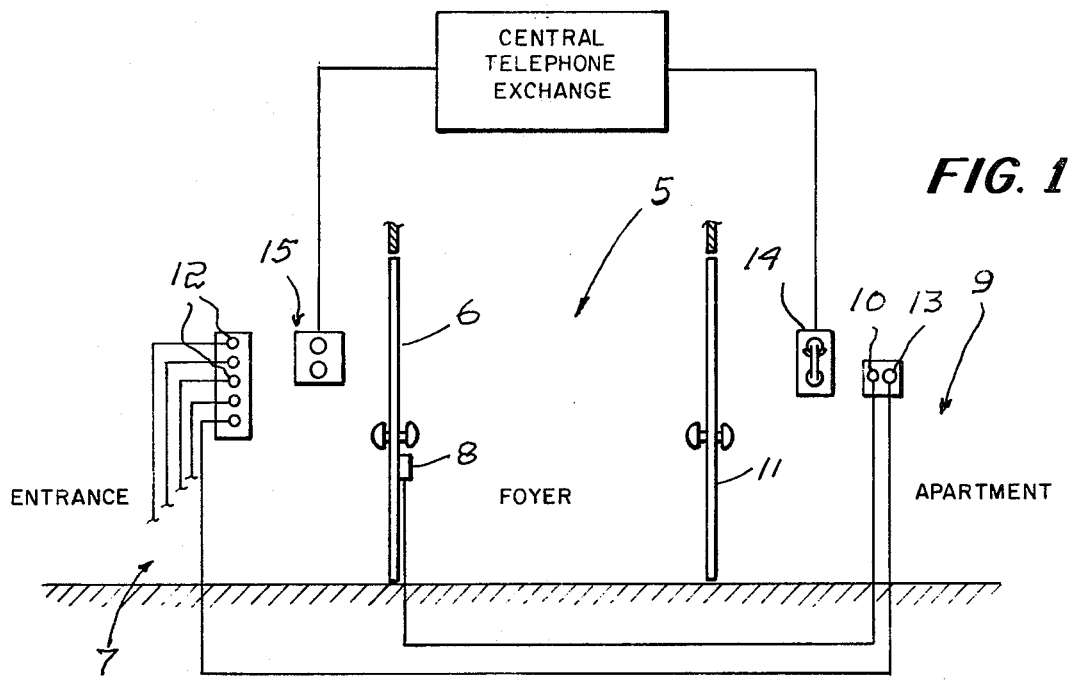
FIG. 1 is a schematic view of a typical installation.

In FIG. 1, the foyer of an apartment house is generally indicated at 5 and has a door 6 between it and the entryway 7. The door 6 is provided with a lock of the type having an electrically operated release 8 operated from any one of the apartments, the apartment 9, for example, by closing a switch 10 located therein near the door 11 of that apartment. Apartments are also commonly provided with buzzer systems by which a person seeking entrance to a particular apartment may alert an occupant thereof. Such a system has a series of push button switches 12 located in the entryway, one switch for each apartment and in control of a buzzer 13 located therein.

Figure 2:
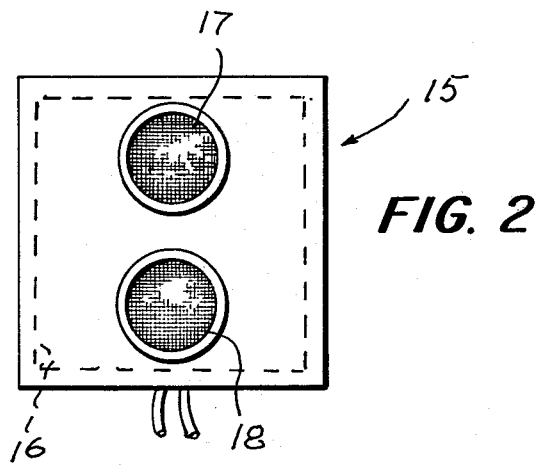
FIG. 2 is a front view of a device in accordance with the invention.

The apartment 9 has a telephone 14 and the entryway 7 is provided with a device in accordance with the invention and generally indicated at 15 and connected to the telephone system. Before detailing the device 14, reference is made to FIG. 2 wherein it is shown as having a casing 16 secured in a wall of the entryway and having screened ports 17 and 18. A speaker 19 is located behind the port 18 and a microphone 20 is located behind the port 18, the casing 16 is typically of a construction providing protection against the weather and minimizing the chance of damage by vandals and attachable in any desired manner, one desirably making theft difficult.

Before detailing the circuitry, it is again noted that it includes a module 21, an authorized protective connecting module (hereinafter sometimes referred to as the APCM). This module is designed by and specified by the American Telephone & Telegraph Company for use as an interface between the telephone lines of the Bell System and customer owned equipment. While the use of the module 21 is required by the American Telephone & Telegraph Company, its functions can be otherwise provided. It provided certain ring detection and line seizure operations, and a path for live speed communication between the person seeking ingress and a person in the appropriate apartment.

Figure 3:
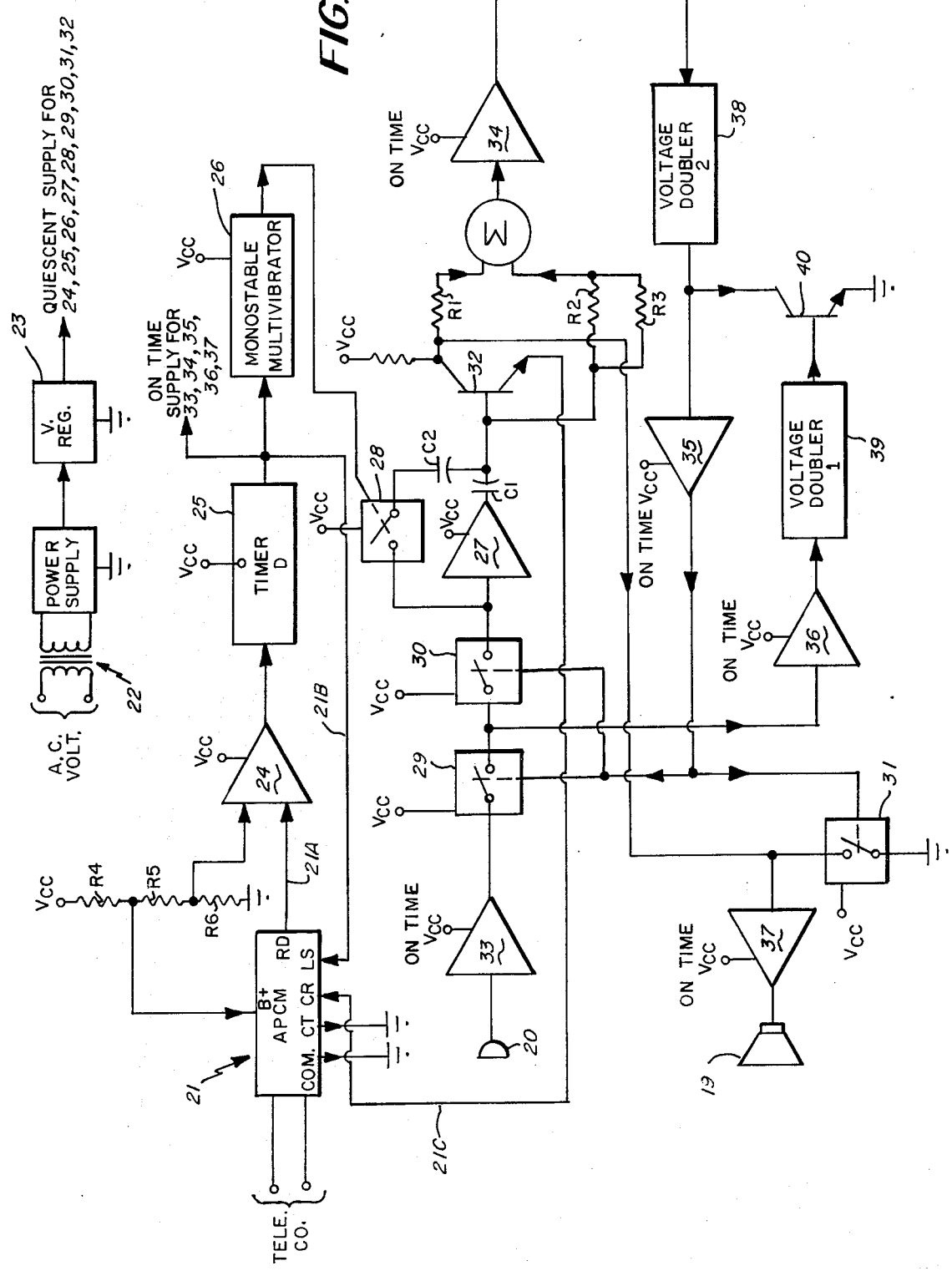
FIG. 3 is a block diagram of the circuitry effecting the operation of the device.
Figure 4A:
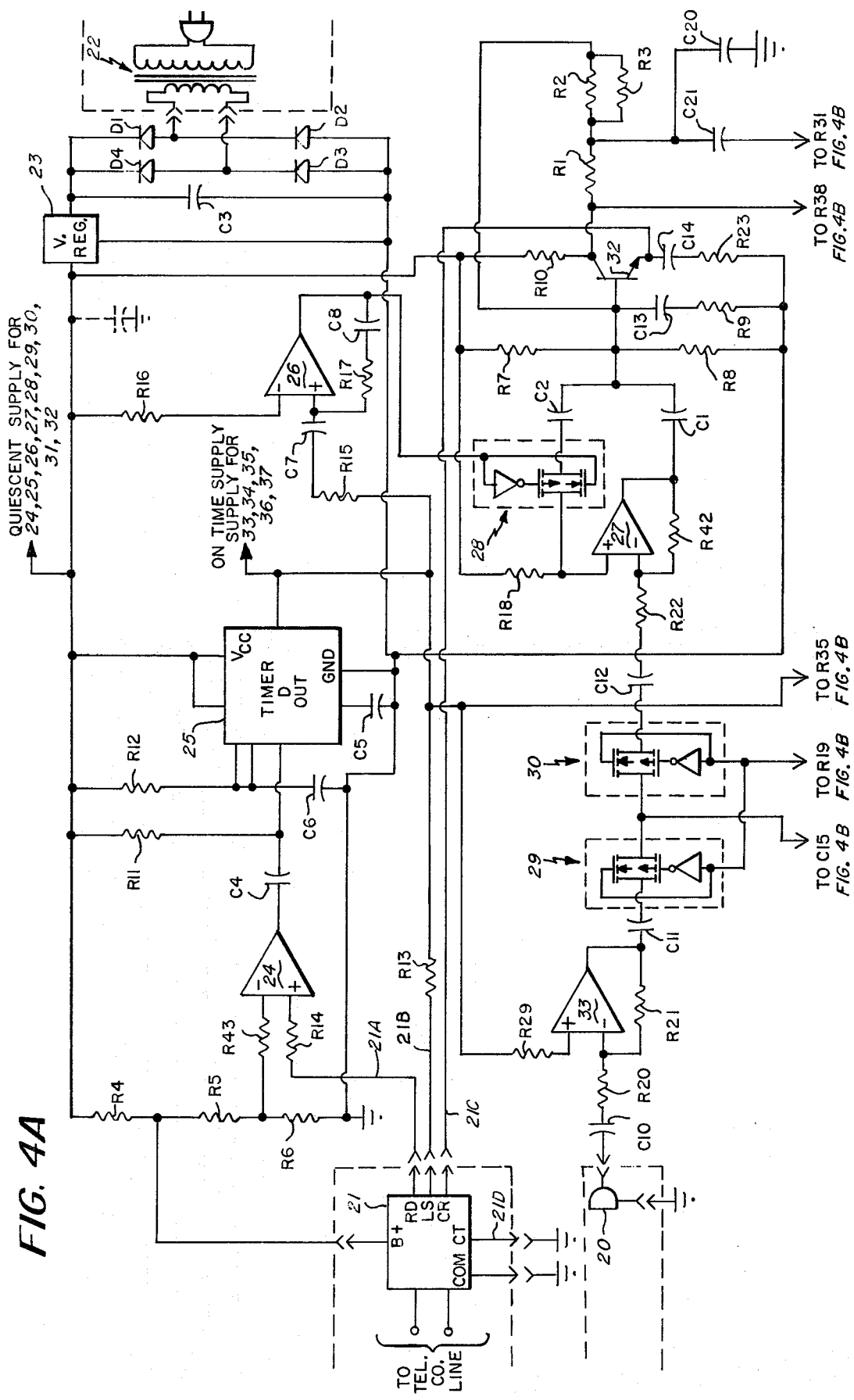
FIGS. 4A and 4B when taken together, are a schematic diagram of the specific circuitry.
Figure 4B:
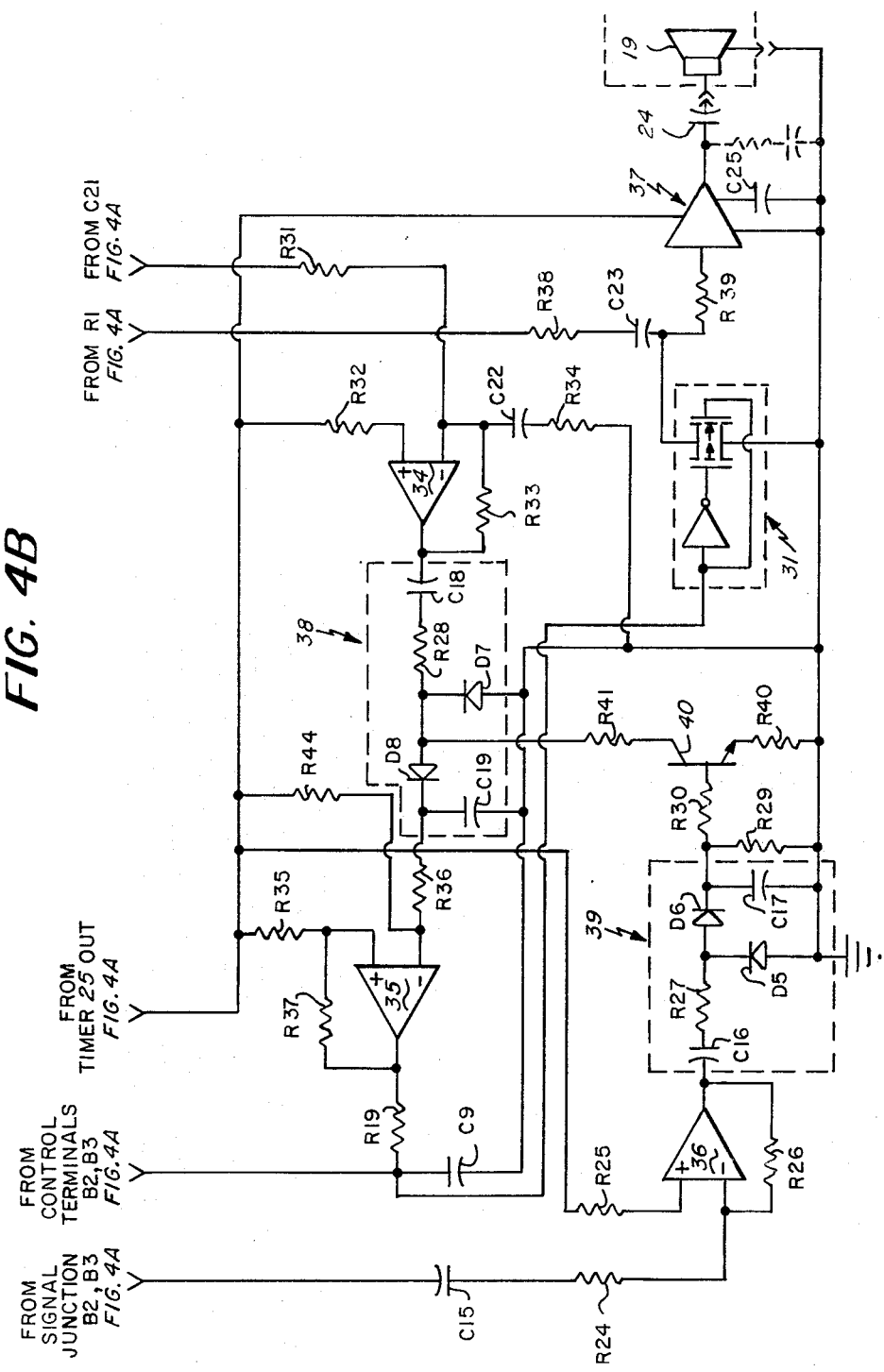

While the circuitry is detailed in FIGS. 4A and 4B, reference is first made to FIG. 3 in which the overall functioning of the device 15 is discussed.

The power supply, fed by low voltage transformer 22, provides full wave rectified and filtered D.C. voltage to a voltage regulator 23, the output of which provides operating supply voltage to amplifier 24 functioning, as embodied in the circuitry, as a voltage comparator, and hereinafter referred to as such; timer circuit 25 and amplifier 26 functioning, as embodied in the circuitry, as a monostable multivibrator 26, and hereinafter referred to as such; transmit amplifier 27 which also serves as a beep oscillator; analog switches 28, 29, 30, and 31, and to transistor 32 and its associated bias circuitry.

In response to an incoming ring signal, the voltage on ring lead 21A from module 21 undergoes a step function, which is, in turn, fed to an input of the voltage comparator 24. The output of voltage comparator 24 initiates an active state or "one time" output voltage for the control circuit via the timer 25. During this active state/"on time", a voltage is provided on the line seizure lead 21B of module 21 and to the remaining speech processing circuitry comprised of a microphone preamplifier 33, receive control amplifier 34, inverting Schmitt trigger 35, transmit control amplifier 36, and speaker amplifier 37. The leading edge of the active state/"on time" voltage step triggers the monostable multivibrator 26, the output of which is a short pulse, which effects an adequately low impedance feedback path through analog switch 28, capacitor C1 and capacitor C2, around transmit amplifier and beep oscillator 27, so as to effect oscillation and provide an audible tone signal for the duration of the short pulse derived from the monostable multivibrator 26.

With neither party speaking, and while active state/"on time" voltage is provided to the additional speech processing circuitry as referenced above, the output of inverting Schmitt trigger 35 is high, thus providing low impedance conduction paths through analog switches 29, 30, and 31, effecting an operating state, hereinafter sometimes referred to as the "talking mode". In this "talking mode", audio signals from the microphone 20 are allowed to pass through and/or be processed by the microphone preamplifier 33, analog switches 29 and 30, the transmit amplifier and beep oscillator 27, into the base of transistor 32, and finally into the telephone line via the line 21C of the module 21 which is in the emitter circuit of transistor 32.

Due to the non-linear voltage follower behavior of the base-emitter junction of transistor 32 and the near unity gain, as it is biased, and phase inversion characterisic of the collector of transistor 32 (operating in the common emitter configuration), the summing point of resistors R1, R2, and R3, will yield a smaller AC voltage in response to a microphone signal entering the base of transistor 32 than it does for an incoming telephone signal (of an equal acoustic level on the telephone line), entering the emitter of transistor 32 via line 21C of module 21.

In the "talking mode", however, even a small amount of AC voltage, after being amplified by receive control amplifier 34, and being converted to DC by voltage doubler, generally indicated at 38, was observed to be large enough, in some cases, to switch the state of inverting Schmitt trigger 35. So as to minimize this possibility and guarantee a high output from the inverting Schmitt trigger 35 in the "talking mode", the microphone signal is additionally fed to the transmit control amplifier 36 and a voltage doubler generally indicated at 39, whose DC output turns on transistor 40, insuring that the input of inverting Schmitt trigger 35 is held low, the output of which is consequently held high, as previously stated. Analog switch 31, in the "talking mode", presents a low impedance to ground to any signals that might otherwise be amplified by speaker amplifier 37. Consequently, speaker 19 is essentially silenced.

So long as a microphone signal of adequate magnitude is provided, the active/"on time" state is still in effect, the circuit will continue to operate in the "talking mode" as just outlined. Once the microphone 20 provides no more signal, or it provides a signal of inadequate magnitude, transistor 40 stops conducting, thus permitting, but in no way effecting, a change of the output state of inverting Schmitt trigger 35.

As previously explained, an incoming telephone line signal (of sufficient magnitude), to the emitter of transistor 32, at the summing point, yields an AC voltage larger than that which would result from microphone signals of equal acoustic level on the telephone line. The AC voltage from an incoming line signal, when amplified by receive control amplifier 34 and processed by voltage doubler 38, produces a DC level sufficient in magnitude to change the output state of inverting Schmitt trigger 35 to a low level.

Analog switch 30, in its high impedance/off state, minimizes the possibility of telephone line origin signals feeding back around transmit amplifier 27 and into transmit control amplifier 36, which could consequently return the system to the "talking mode". Analog switch 31, now exhibiting a high impedance, no longer shunts to ground most of the signal to the input of speaker amplifier 37, consequently, incoming telephone line signals are amplified by speaker amplifier 37 and fed to speaker 19. This "listening mode", with the microphone signal path effectively open and speaker amplifier 37 amplifying the incoming telephone line signals, continues so long as the incoming telephone line signal is of sufficient magnitude. When the incoming telephone line is not of sufficient magnitude, or ceases completely, the circuit returns to its "talking mode".

Analog switch 29 prevents transmit control amplifier 36 from responding to speaker signals that are picked up by the microphone and amplified by microphone preamplifier 33.

When the output of inverting Schmitt trigger 35 goes low, a "listening mode" is effected in which analog switches 29, 30, and 31 are in their high impedance/off states. Analog switches 29 and 30 present a very high impedance to signals that would, in the "talking mode", pass into the transmit amplifier 27.

An inverting Schmitt trigger is employed to effect this mode switching operation owing to its hysteretic property which provides (in response to the voltage across capacitor C19) a time delay sufficient to facilitate natural speech communication by not permitting mode switching during a brief pause between syllables or words. This effect results from the difference in the trigger and release voltages of inverting Schmitt trigger 35 as are provided by capacitor C19 as it charges and discharges in response to speech signals.

This operation of the circuit, as just outlined, continues until the active/"on time" is terminated by whatever means are employed to effect that result. At completion of the active state/"on time", the telephone line is released/"hung up" and the speech processing circuitry operating voltage is removed so as to return the device to its standby/quiescent state.

Specific details of the circuitry are shown in FIGS. 4A and 4B in which the power supply is shown as having diodes D1, D2, D3, and D4 and a capacitor C3 between the transformer 22 and voltage regulator 23. The output of voltage regulator 23 is provided as the operating supply voltage to: voltage comparator 24; monostable multivibrator 26; transmit amplifier 27; analog switches 28, 29, 30, and 31; the voltage divider comprised of resistors R4, R5, and R6; the biasing circuitry of transistor 32 comprised of resistors R7, R8, and R10; and timer circuit 25 and its associated resistors R11 and R12.

The junction of resistors R4 and R5 provides operating voltage to the B+/supply voltage for module 21. The junction of resistors R5 and R6 provides a reference voltage through resistor R43 to voltage comparator 24. In response to an incoming ringing signal, the voltage of ring lead 21A from module 21 undergoes a step function and this voltage is fed through resistor R14 to voltage comparator 24. Capacitor C4 and pull-up resistor R11 act to differentiate the resulting step-function from voltage comparator 24 so as to provide a narrow pulse necessary to trigger timer circuit 25. Capacitor C5 provides a degree of noise filtration for timer circuit 25.

Once triggered, timer circuit 25 provides a high output level, referred to as the active/"on time" voltage for a specified duration as determined by resistor R12 and capacitor C6. In the preferred embodiment, this duration is approximately twenty seconds by way of a preferred example and not by way of limitation.

This active/"on time" voltage is provided, in addition to other circuitry, to the lead 21B of the module 21 so as to effect line seizure through dropping resistor R13. For the duration of this active/"on time" period, operating voltage is provided to microphone preamplifier 33, inverting Schmitt trigger 35, receive control amplifier 34 transmit control amplifier 36 and speaker amplifier 37. Additionally, the active/"on time" voltage step function is fed through resistor R15 and capacitor C7 which differentiate its leading edge so as to provide a narrow pulse required to the input of monostable multivibrator 26.

Resistor R16 provides a bias current to monostable multivibrator 26. Resistor R17 and capacitor C8 determine the duration of its output pulse which is, by way of example and not of limitation, approximately one second. Only during this one second period does analog switch 28 present a low impedance feedback path from the output of transmit amplifier 27, through capacitors C1 and C2, to one of its inputs thereby effecting oscillation. Resistor R18 provides a bias current to transmit amplifier 27 which is required for proper operation thereof, and the ratio of resistors R42 and R22 determines the gain of this stage. The tone signal resulting from this oscillation is provided to speaker amplifier 37, speaker 19 and the calling party through: transistor 32; line 21C; module 21; and the telephone line.

While the active/"on time" voltage is provided, and if the party initiating the incoming call is not speaking, the output of inverting Schmitt trigger 35 will be in its high state. Resistor R19 and capacitor C9 are used to slow down (as a result of partial integration of their junction) the transition of the output voltage state of inverting Schmitt trigger 35 so as to minimize an audible click evident on the telephone line, generated thereby as the system changes mode. The voltage at the junction of resistor R19 and capacitor C9 controls analog switches 29, 30, and 31. As previously defined, while the output voltage of inverting Schmitt trigger 35 is high, the system is in the "talking mode" and, while this voltage is low, the system is in the "listening mode".

Signals from microphone 20 are coupled via capacitor C10 and resistor R20 into microphone preamplifier 33. The ratio of resistors R21 and R20 determines its gain. Resistor R29 provides a bias current to microphone preamplifier 33. While in the "talking mode", analog switches 29 and 30 present low impedance paths for preamplified microphone signals through their respective input-output terminals. Blocking capacitors C11 and C12 and resistor R22 provide a path to transmit amplifier 27. Capacitor C1, in addition to providing a feedback path as stated, couples the output of transmit amplifier 27 to the base of transistor 32.

Resistors R7 and R8 provide base bias to transistor 32 and resistor R10 is the collector load resistor for it. Capacitor C13 and resistor R9 roll-off high frequencies by providing them a low impedance path to ground. Lead 21C of module 21 is connected to the emitter of transistor 32 and lead 21D of module 21 connected to ground. Capacitor C14 and resistor R23, in addition to rolling-off high frequencies, act to balance the inductive reactive component of the (CR-CT) winding of the transformer in APCM module 21 (used to couple audio-signals into and out of the telephone line), thus decreasing considerably, its phase shift at voice frequencies.

While in the "talking mode", microphone signals are additionally fed via resistor R24 and capacitor C15 to transmit control amplifier 36. Its bias current is provided by resistor R25 and its gain is controlled by the ratio of resistors R26 and R24.

Capacitor C16, resistor R27, diodes D5 and D6, and capacitor C17 comprise voltage doubler 39, the DC output of which is a function of the output amplitude of transmit control amplifier 36. Capacitor C18, resistor R28, diodes D7 and D8, and capacitor C19 comprise voltage doubler 38, the DC output of which is a function of the output amplitude of receive control amplifier 34.

In the "talking mode", the DC voltage (developed as a result of microphone signals) across capacitor C17 and resistor R29 is fed via resistor R30 to transistor 40 so as to effect conduction therethrough. Resistors R40 and R41 and transistor 40, in its conducting/on state, provide a low impedance path from the junction of diodes D7 and D8 and resistor R28 of voltage doubler 38 to ground. This minimizes the possibility of capacitor C19 in voltage doubler 38 from charging as a result of signals inadvertently provided by the output of receive control amplifier 34. This function is of particular importance inasmuch as the summing point could yield, even in the "talking mode" after processing by receive control amplifier 34 and voltage doubler 38, a voltage large enough to effect switching of the output state of inverting Schmitt trigger 35. Since capacitor C19 is prevented from charging to a level necessary to effect a change of state of the output of inverting Schmitt trigger 35, the output of the inverting Schmitt trigger consequently remains high, as previously stated.

When microphone 20 no longer provides a signal of sufficient magnitude to keep transistor 40 turned on, the circuitry returns to a state in which either a "talking mode" or a "listening mode" can be effected. Should microphone 20 provide a signal again (e.g., after a pause), the signal will be processed as described, and the "talking mode" will again ensue.

Conversely, should a signal not originating at microphone 20 present itself on the telephone line, this device is necessarily capable of discerning the origin of the signal. It should be noted and understood that a microphone signal, which is coupled into the telephone line, exists concurrently at microphone 20 and on the telephone line, rendering the determination of the signal origin a difficult task. Telephone line origin signals must be prevented from reaching transmit control amplifier 36, as their presence could consequently prevent the inverting Schmitt trigger 35 from switching into the "listening mode". Analog switch 30 which is in its off-/high impedance state during the "listening mode", prevents this from happening.

Resistors R1 and R2, and R3 for trimming R2, and transistor 32 are the principal components of circuitry designed to discern the origin of signals existing concurrently at microphone 20 and on the telephone line.

Operating in the common emitter configuration, the emitter of transistor 32 "follows" the base voltage in relative amplitude and phase except for a diode drop across the base-emitter (pn junction); its collector produces a signal inverted in phase to that of the base. One function of transistor 32 (with the CR & CT winding of the audio transformer which is an integral part of module 21 and is in its emitter circuit) is to provide a unity gain, impedance matching, voltage follower so as to feed microphone signals into the telephone line. Concentrating primarily on first order effects, the collector voltage gain can be set to near unity by making equal the respective load impedances of the emitter and of the collector. With a collector voltage gain of near unity, the algabraic sum of the signals at the base and at the collector of transistor 32 should total zero volts AC. The junction of resistors R1 and R2, and R3 for trimming R2, comprise the summing point.

Considering that the bipolar junction transistor is not a perfectly unilateral device, external components and biasing techniques are employed so as to approximate operation thereof. This is necessary to maximize the effectiveness of the summing technique employed. Since collector signals are being compared to base signals (originating at microphone 20) and to emitter signals (originating on the telephone line), a greater difference will be realized by isolating the emitter signal from the base signal. In the particular biasing scheme employed, sometimes referred to as the modified source biasing technique, it should be noted that a voltage of sufficient magnitude and appropriate polarity, introduced to the emitter of the transistor 32, is capable of effecting a corresponding variation of the voltages at the other elements of the transistor. In particular a positive perturbation of the emitter voltage results in a decrease of the base-emitter voltage thereby increasing the voltage at the collector. This relationship between the phases of the base and collector voltages is not consistent with the properties normally attributed to the conventional common emitter configuration. Because AC signals (originating on the telephone line) enter the emitter of transistors 32 and are observed at its collector, this stage might be considered as operating in a "quasi-common base" configuration in the "listening mode".

In view of the foregoing explanation of the operation and function of transistor 32 it should be obvious that the summing point yields a smaller AC voltage in response to a microphone signal entering the base of transistor 32 than it does for an incoming telephone signal (of an equal acoustic level on the telephone line), entering the emitter of transistor 32.

It was observed that for two signals (of equal acoustic level on the telephone line)-one originating at the microphone 20 and the other injected directly into the emitter-the difference between the two AC voltages resulting at the summing point was as much as 24 dB.

As to the operation of the remaining incoming speech processing circuits, capacitor C20 at the summing point shunts to ground any high frequency artifacts or speech signals that might effect an undesirable switching of modes. Capacitor C21 and resistor R31 couple the incoming signal into receive control amplifier 34. Bias current is supplied by resistor R32. The gain of receive control amplifier 34 is determined by the ratio of resistors R33 and R31. Resistor R34 and capacitor C22 additionally roll off high frequencies.

As stated previously, the DC output of voltage doubler 38, in the "listening mode", is a function of the amplitude of the output of receiver control amplifier 34. The upper trip point and the lower trip point (consequently the hysteresis) of inverting Schmitt trigger 35 are determined by resistors R35 and R36, R37, and R44.

When, in response to an incoming telephone line signal, the input of inverting Schmitt trigger 35 goes high (resulting in a low output), analog switches 29, 30, and 31 turn off presenting their high impedance states.

A voltage divider (from the collector of transistor 32 to ground) comprised of resistor R38 and capacitor C23 and analog switch 31 determines the amount of signal that is fed to speaker amplifier 37. The output of the divider chain is the junction of capacitor C23 and analog switch 31. The voltage at this point is fed via resistor R39 to the speaker amplifier 37. As stated previously, when analog switch 31 is in its on/low impedance state (as in the "talking mode"), the signal that might otherwise be fed to speaker amplifier 37 through resistor R39 is shunted to ground. When analog switch 31 is in its off/high impedance state (as in the "listening mode") the incoming signal (picked up at the collector of transistor 32) passes through resistor R38, capacitor C23 and resistor R39 to the input of speaker amplifier 37. The output of speaker amplifier 37 is coupled via capacitor C24 to the speaker 19, providing an output signal to same. Bypass capacitor C25 is employed to provide power supply decoupling for the speaker amplifier 37.

From the foregoing, it will be apparent that the invention provides circuitry capable of meeting a wide range of requirements of systems for automatic answering and live speech communication. In particular and in the case of a building where there is a controlled access area, the device for use therewith is incapable of enabling a call to be initiated therefrom, but is otherwise well adapted to meet all requirements of a system having talk and listen modes of operation, and with handsfree operation being a desirable or necessary feature.

We claim:

1. A device connectable to a system providing a path for two way live speech communication and a calling signal, said device including speech processing circuitry incorporating a microphone, a speaker and their respective circuits, and a common line for incoming and outgoing signals, speech control circuitry providing means for discerning the origin of speech signals originating at either the microphone or incoming over said common line and operable to enable alternatively either live microphone speech signals to reach said line or live telephone line speech signals to reach the speaker depending on whichever live speech signal is introduced into said device first, said speech control circuitry including switching means operable to render, in the alternative, said microphone capable of transmitting signals over said common line or said speaker capable of receiving signals of approximately the same acoustic level incoming on said common line, said switching means including a Schmitt trigger and operable in response to signals of different magnitude, and means operable to convert incoming and outgoing signals of said level into signals of appropriately different levels and to deliver such signals to said Schmitt trigger, and a system control circuit controlled by the output of the Schmitt trigger and connectable to and controlling said system and connected to and controlling said speech processing circuitry and provided with timer means operable on said calling signal to provide a control voltage for a predetermined interval for said circuits and circuitry to effect and maintain line seizure and to release said line upon reduction in amplitude of said voltage.

2. The device of claim 1 in which the signal converting means includes a transistor, the base of which is included in the microphone circuit and the emitter of which is connected to said common line, the collector and emitter impedances of said transistor set so as to provide a collector voltage gain of near unity, and resistors connected to said base, said collector, and to each other, the junction of said resistors defining a summing point the AC voltage at which is substantially greater in response to a signal entering said emitter than one entering said base with said signals being of the same acoustic level.

3. The device of claim 2 and an amplifier and a voltage doubler and a ground lead including a transistor between the summing point and the Schmitt trigger, and the microphone circuit includes means operable to turn said transistor on when the microphone circuit is connected to said common line thereby to shunt away from the input to the Schmitt trigger signals resulting from the amplification of small voltages occurring at the summing point while the microphone circuit is in use and thus prevents unwanted switching.

4. The device of claim 3 and means to shunt to ground signals in the speaker circuit and operable by the outputs of the Schmitt trigger that render the microphone circuit operable.

5. The device of claim 1 in which the speech processing circuitry includes a transmit amplifier and at least one analog switch arranged in series in the microphone circuit, and at least one amplifier in the speaker circuit and an analog switch shunting to ground input signals in said speaker circuit, and the means in said speech control circuitry for determining signal origin are in control of said analog switches and are operable to effect the exhibition of their low impedance values so as to effect a "talking mode" in the absence of signals originating on the common line, thereby providing a low impedance signal path from the microphone to the common line and squelching the speaker amplifier and said means for determining said signal origin are also operable to effect the exhibition of the high impedance values of said analog switches as to effect a "listening mode" in response to signals originating on the common line, thereby preventing the microphone signals from reaching the common line and allowing signals therefrom to be amplified and fed to the speaker.

6. The device of claim 5 in which the microphone circuit also includes a preamplifier and a second analog switch and said transmit amplifier all in series, the signal occuring at the junction between the analog switches fed to said shunting transistor.

7. The device of claim 6 and an amplifier and voltage doubler arranged in series between said junction and said transistor.

8. The device of claim 1 in which resistances associated with said Schmitt trigger provide tripping points and hysteretic properties, the speech control circuitry includes a capacitor in a manner to be charged by incoming speech signals and discharged in their absence so as to effect a short time delay before switching from one mode of operation to the other in a manner conducive to natural speech patterns by allowing for natural pauses between syllables and words.

9. The device of claim 1 and means operated by said timer to introduce an audible signal for a short part of said interval into said speaker circuit.

10. The device of claim 5 and means operated by said timer to introduce an audible signal for a short part of said interval into said speaker circuit, said means including a circuit closed when said timer is energized and including a monostable multivibrator, an analog switch, a capacitor, said transmit amplifier and associated capacitors, said multivibrator operable to effect the low impedance value of the analog switch for said part of the timed interval, said analog switch, transmit amplifier and capacitors connected in a loop to establish a feedback path operable to pass current around the amplifier and thereby to effect oscillation thereof.

11. A device connectable to a system providing a path for two way live speech communication and a calling signal, said device including speech processing circuitry incorporating a microphone, a speaker and their respective circuits, and a common line for incoming and outgoing signals, speech control circuitry providing means for discerning the origin of speech signals originating at either the microphone or incoming over said common line and operable to enable alternatively either live microphone speech signals to reach the speaker depending on whichever live speech signal is introduced into said device first, said speech control circuitry including switching means operable to render, in the alternative, said microphone capable of transmitting signals over said common line or said speaker capable of receiving signals of approximately the same strength incoming on said common line, said switching means including a Schmitt trigger and operable in response to signals of different magnitude, and means operable to convert incoming and outgoing signals of said strength into control operating signals of appropriately different strengths and to deliver such signals to said Schmitt trigger, and a system control circuit controlled by the output of the Schmitt trigger and connectable to and controlling said system and connected to and controlling said speech processing circuitry and provided with means operable on said calling signal to provide a control voltage to effect and maintain line seizure and to release said line upon reduction in amplitude of said voltage.

12. The device of claim 11 in which the signal converting means includes a transistor, the base of which is included in the microphone circuit and the emitter of which is connected to said common line, the collector and emitter impedances of said transistor set so as to provide a collector voltage gain of near unity, and resistors connected to said base, said collector, and to each other, the junction of said resistors defining a summing point the AC voltage at which is substantially greater in response to a signal entering said emitter than one entering said base with said signals being of the same acoustic level.

13. The device of claim 12 and an amplifier and a voltage doubler and a ground lead including a transistor between the summing point and the Schmitt trigger, and the microphone circuit includes means operable to turn said transistor on when the microphone circuit is connected to said common line thereby to shunt away from the input to the Schmitt trigger signals resulting from the amplification of small voltages occurring at the summing point while the microphone circuit is in use and thus prevents unwanted switching.

14. The device of claim 13 and means to shunt to ground signals in the speaker circuit and operable by the outputs of the Schmitt trigger that render the microphone circuit operable.

15. The device of claim 11 in which the speech processing circuitry includes a transmit amplifier and at least one analog switch arranged in series in the microphone circuit, and at least one amplifier in the speaker circuit and an analog switch shunting to ground input signals in said speaker circuit, and the means in said speech control circuitry for determining signal origin are in control of said analog switches and are operable to effect the exhibition of their low impedance values so as to effect a "talking mode" in the absence of signals originating on the common line, thereby providing a low impedance signal path from the microphone to the common line and squelching the speaker amplifier and said means for determining said signal origin are also operable to effect the exhibition of the high impedance values of said analog switches as to effect a "listening mode" in response to signals originating on the common line, thereby preventing the microphone signals from reaching the common line and allowing signals therefrom to be amplified and fed to the speaker.

16. The device of claim 15 in which the microphone circuit also includes a preamplifier and a second analog switch and said transmit amplifier all in series, the signal occuring at the junction between the analog switches fed to said shunting transistor.

17. The device of claim 16 and an amplifier and voltage doubler arranged in series between said junction and said transistor.

18. The device of claim 11 in which resistances associated with said Schmitt trigger provide tripping points and hysteretic properties, the speech control circuitry includes a capacitor in a manner to be charged by incoming speech signals and discharged in their absence so as to effect a short time delay before switching from one mode of operation to the other in a manner conducive to natural speech patterns by allowing for natural pauses between syllables and words.

19. The device of claim 1 in which the system is a telephone line and the device includes additional circuitry operable to respond to a ringing signal then to provide voltage to initiate the operation of the timer, a relay energized by said timer while in operation, a transformer the primary of which is included in said common line, said relay, when energized connecting the secondary of said transformer across said telephone line.

20. The device of claim 11 in which the system is a telephone line and the device includes additional circuitry operable to respond to a ringing signal then to provide voltage to operate a relay, a transformer, the primary of which is included in said common line and the secondary of which is connected across the telephone line when said relay is energized.

* * * * *